W. B. READY.
PLOW-POINT.

No. 172,053. Patented Jan. 11, 1876.

Witnesses:
Robert Christopher Clark
Benjamin Bullard, Jr.

Inventor
William Bell Ready.

UNITED STATES PATENT OFFICE.

WILLIAM B. READY, OF SACRAMENTO, CALIFORNIA.

IMPROVEMENT IN PLOW-POINTS.

Specification forming part of Letters Patent No. 172,053, dated January 11, 1876; application filed October 16, 1875.

*To all whom it may concern:*

Be it known that I, WM. B. READY, of Sacramento, California, have invented a new and Improved Method of Attaching Plowshares (or plow-points, as they are now more commonly called) to the Mold-Board and Land-Side of Plows; and I do hereby declare that the following is a full, clear, and exact description thereof, reference being had to the accompanying drawings forming a part of this specification.

Figure 1:
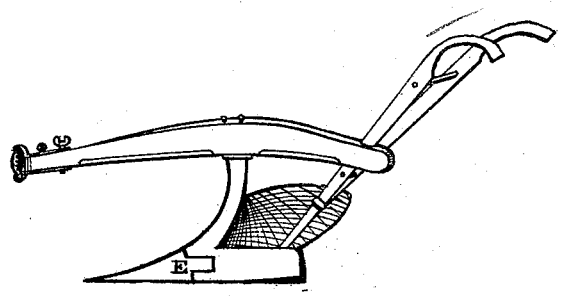
Figure 3:
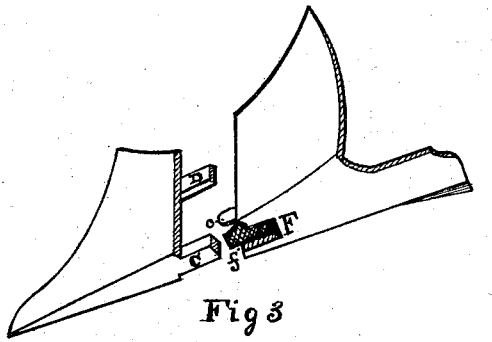
Figure 2:
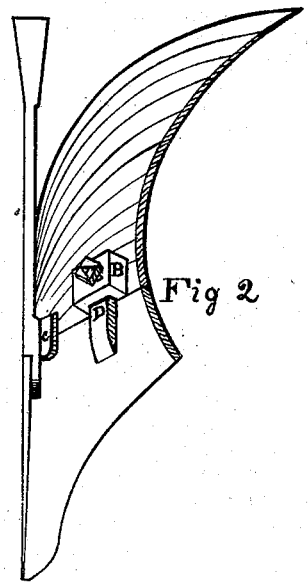

Figure 1 is a perspective view of a plow, partially showing the mode in which the plow-point is attached at E. Fig. 2 is a view showing the plow from the bottom, with the plowshare fastened to the plow by a set-screw, A, which passes through the socket B, and, pressing on the tenon D, fastens the plowshare firmly to the plow. Fig. 3 is a view of the plow from the top, showing the plowshare, mold-board, and land-side adjusted and ready to be put together.

$c$ is a projecting lug on the mold-board. D is an oblique extension or tenon on the plowshare, and passes through the socket B, as shown in Fig. 2. C is a dovetailed land-side bar on the plowshare, which slips into the land-side F, having a dovetailed groove, $f$, made to receive it. When thus put together the plowshare cannot spring either up or down, and when the screw A is screwed down onto the tenon D the plowshare cannot slip from its place either in turning or in drawing the plow backward.

Figure 4:
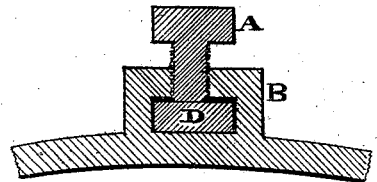

Fig. 4 is a cross-section of the screw and socket, and is an important feature of my invention, as it enables the share to be attached to the mold-board without the use of bolts or the use of frogs or plates on the under side of the plowshare, and makes said plowshare more durable, as it can be used until it is worn much closer to the mold-board.

A is the screw; B, the socket; D, the tenon, kept firmly in its place by the screw A.

What I claim as new, and desire to secure by Letters Patent, is—

The plowshare having the dovetailed land-side bar C and the oblique extension or tenon D, in combination with the land-side F, having the dovetailed groove $f$, and the mold-board provided with the socket B, the set-screw A, and the projecting lug $c$, all arranged as and for the purposes set forth.

WILLIAM BELL READY.

In presence of—
 ROBT. C. CLARK,
 ALFRED G. FOLGER,
 BEN. BULLARD, Jr.